(12) United States Patent
Grasso

(10) Patent No.: US 8,938,862 B2
(45) Date of Patent: Jan. 27, 2015

(54) TIE-DOWN STRAP WITH BRAKING SYSTEM AND METHOD

(76) Inventor: Andre' Grasso, Garrison, NY (US)

( * ) Notice: Subject to any disclaimer, the term of this patent is extended or adjusted under 35 U.S.C. 154(b) by 670 days.

(21) Appl. No.: 13/093,959

(22) Filed: Apr. 26, 2011

(65) Prior Publication Data

US 2012/0275853 A1 Nov. 1, 2012

(51) Int. Cl.
*A44B 1/04* (2006.01)
*B60P 7/08* (2006.01)

(52) U.S. Cl.
CPC ..................................... *B60P 7/083* (2013.01)
USPC ........................................................... 24/170

(58) Field of Classification Search
USPC ......... 24/134 R, 134 KB, 170, 168, 191, 192, 24/70 ST, 69 ST, 68 CD, 68 A, 68 B; 224/42.39
See application file for complete search history.

(56) References Cited

U.S. PATENT DOCUMENTS

| | | | | |
|---|---|---|---|---|
| 928,392 A | * | 7/1909 | Markham | 24/24 |
| 2,081,546 A | * | 5/1937 | Macpherson | 180/296 |
| 3,883,928 A | * | 5/1975 | Blake | 24/163 R |
| 4,790,049 A | * | 12/1988 | Grosh | 24/132 WL |
| 5,531,297 A | * | 7/1996 | Pipan | 188/65.1 |
| 5,864,927 A | * | 2/1999 | Liu | 24/163 R |
| 7,051,407 B2 | * | 5/2006 | Hsu | 24/170 |
| 7,171,731 B1 | * | 2/2007 | Borcherding | 24/302 |
| 7,861,382 B1 | * | 1/2011 | Madachy et al. | 24/68 CD |
| 8,522,402 B1 | * | 9/2013 | Spooler | 24/69 CT |

* cited by examiner

*Primary Examiner* — Victor Batson
*Assistant Examiner* — Matthew Sullivan
(74) *Attorney, Agent, or Firm* — Clifford Kraft

(57) ABSTRACT

A lever latch/strap tie system that can include a screw-down lock mechanism that securely holds a brake plate against the strap. Generally, the strap-locking latch has a latch frame that receives a strap so that the strap lies flat against at least a portion of the latch frame. A locking lever engages the strap and presses a portion of the strap against the latch frame. A screw-down knob, or other locking knob abuts a braking plate where the braking plate is positioned above the strap. When the screw-down knob is tightened, it securely clamps the strap between the braking plate and the latch frame. The brake plate can contain at least one insert which contacts the strap when the screw-down clamp is tightened. This can be a grommet or other insert. This increases the friction and further prevents slipping. The entire product including the latch and hook can be scalable to different size straps such as 1 inch, 1.5 inches, 2 inches and the like. A slitted hook can allow a pre-sewn strap to be inserted during assembly.

11 Claims, 5 Drawing Sheets

Section A

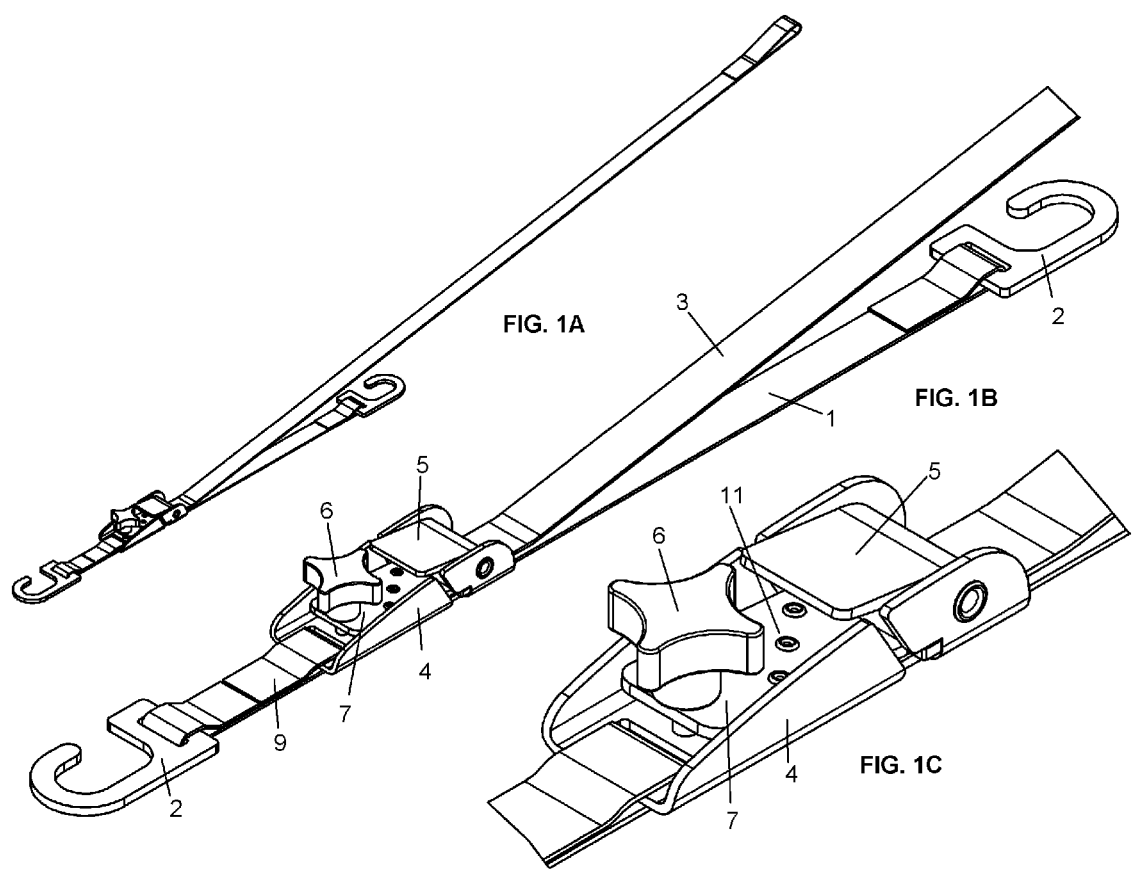

TIE-DOWN STRAP WITH BRAKING SYSTEM AND METHOD

BACKGROUND

1. Field of The Invention

The present invention relates generally to the field of tie-down systems and more particularly to a tie-down strap braking system and method.

2. Description of the Prior Art

Tie down and securing systems using straps with latches are well-known in the art. A common type of system has a lever handle that, when rotated, presses down and grips a fabric strap. This type of system can be found on straps for trailers, straps for dollies and lifts and in numerous other applications. Despite their wide-spread use, these prior art friction-locking systems have a major flaw: they tend to slip or to come completely loose, sometimes resulting in complete loss of the strapped item or load. The reason they slip is that they work on a lever principle where the long end of the lever forms the release and engage handle with the small part of the lever compressing the fabric. The small part of the handle generally has teeth and rides on the fabric in a clamped position. This may cause the lever to stick out where it can be inadvertently bumped or pushed. Also, pulling one direction on the strap generally causes the grip to tighten; unfortunately, pulling the other direction may cause it to loosen. If the lever is pushed the wrong way, or there is enough tension in the loosening direction, the springiness of the fabric and the strap tension can cause the grip to loosen to where the strap begins to slip through the grip. This then may cause the grip to become even looser. Finally, the entire assembly can disengage.

It would be extremely advantageous to have a latch/strap tie system that could be locked down so that the latch lever cannot loosen or disengage, and, hence, the strap cannot slip.

SUMMARY OF THE INVENTION

The present invention relates to a strap tie-down braking system that can include a screw-down lock mechanism that securely holds a brake plate against the strap. Generally, the strap-locking latch of the present invention has a latch frame that receives a strap so that the strap lies flat against at least a portion of the latch frame. A locking lever engages the strap and presses a portion of the strap against the latch frame. A screw-down knob, or other locking knob abuts a braking plate where the braking plate is positioned above the strap. When the screw-down knob is tightened, it securely clamps the strap between the braking plate and the latch frame. The brake plate can contain at least one insert which contacts said strap when the screw-down clamp is tightened. This can be a grommet or other insert. This increases the friction and further prevents slipping. The product including hooks and latches is scalable to different size strap material such as 1 inch, 1.5 inch, 2 inch and the like.

DESCRIPTION OF THE FIGURES

Attention is now directed to several drawings that are presented to aid in understanding features of the present invention:

FIGS. 1A, 1B show embodiments of the present invention on two different size straps with different size latches.

FIG. 1C shows a perspective view of a locking latch/strap system.

Figure 2A:
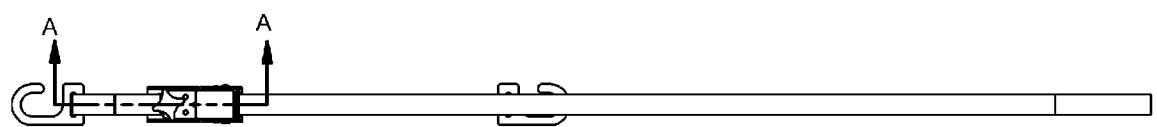
FIG. 2A shows a top view of a strap system with sectioning marks.

Several drawings have been presented to illustrate the present invention. The scope of the present invention is not limited to what is shown in the figures.

DESCRIPTION OF THE INVENTION

The present invention provides a way to assure that a latch/strap type tie or belt will not slip or disengage even under heavy loading, bumping, pushing, vibration, or even attempted opening of the latch lever. FIGS. 1A-1C show several different sized embodiments of the present invention. A strap 1 is attached on one end to a hook 2. The other end 3 threads through a latch mechanism 4. A typical lever latch 5 forms a handle for initial tightening. A second strap 9 runs out to a second hook 2'. A locking knob 6 allows tightening of a brake plate 7 down against the strap 3. The slightly elongated brake plate 7 securely engages the strap 3 over an extended surface area. The knob 6 can be adapted to be moved up and down by being screwed along a threaded post 8 to achieve leverage and achieve sufficient tightness of the brake 7 against the strap 3 to prevent slipping under various loading conditions. The locking knob 6 can also move upward and downward by any other means. FIG. 1C particularly shows a close-up view of the brake 7 and screw knob 6.

Figure 2B:
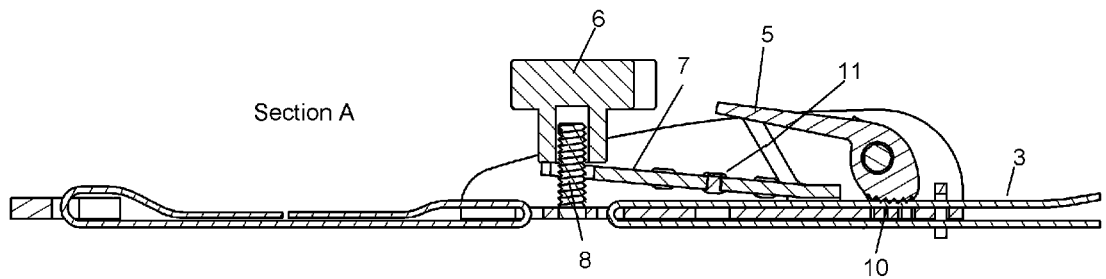
FIG. 2B shows a sectional side view of a locking latch/strap system of FIG. 2A.

FIG. 2A shows a top view of one of the embodiments of FIGS. 1 with section marks. FIG. 2B is a sectional view based on the section marks in FIG. 2A. The lever arm 5 engages the strap 3 at a point 10 in a typical way. The knob 6 screws down a vertical screw 8 that pushes the brake plate 7 downward onto the strap 3. The surface area of the brake plate 7 in contact with the strap 3 creates a sufficiently large frictional area to prevent any strap slipping as the strap 3 is clamped between the brake plate 7 and the latch frame 4. The result is a tight clamp on the strap that prevents slipping. FIG. 2B also shows that the brake plate 7 can contain inserts 11 that can be rivets or grommets that are adapted by being positioned to engage the strap and by protruding outward to enhance the clamping action of the brake 7 against the strap 3. FIG. 2B shows a hole 12 located under an insert 11. FIG. 2B shows a cam 13 coupled to the brake plate 7 with a lever 14.

Figure 3A:
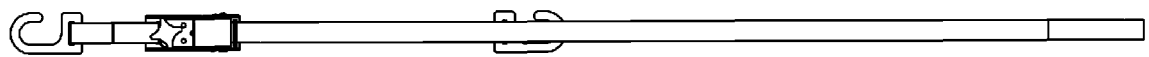
FIGS. 3A-3B show a top view of an embodiment of the present invention.
Figure 3B:
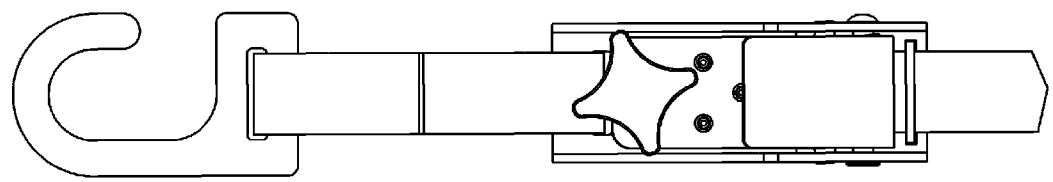
Figure 4A:
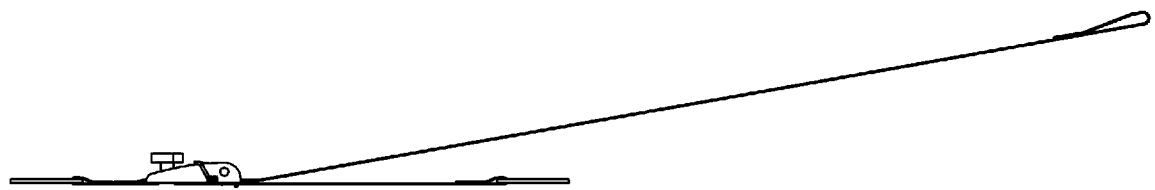
FIGS. 4A-4B show a side view of the embodiment of FIGS. 3A-3B.
Figure 4B:
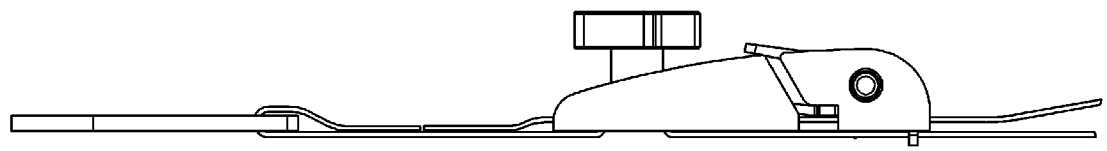

FIGS. 3A-3B show a top view of an embodiment of the invention, while FIGS. 4A-4B show a side view. The entire product including the latch with brake and the hook can be scalable to different size straps including 1 inch, 1.5 inches, 2 inches, and any other strap size.

Figure 5:
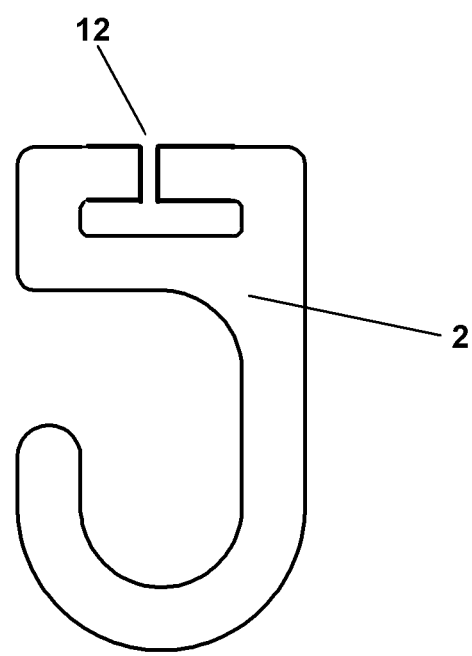
FIG. 5 shows an embodiment of a slitted hook.

The latch and locking mechanism of the present invention can be made from metal, plastic or any other strong, rigid material. The straps can be standard fabric straps or any other type of straps. FIG. 5 shows an embodiment of the invention where the hook 2 is be made with a slit 12 that allows pre-sewing of the strap and later insertion into the hook. This is particularly advantageous for quick assembly.

Several descriptions and illustrations have been presented to aid in understanding the present invention. One with skill in the art will realize that numerous changes and variations can be made without departing from the spirit of the invention. Each of these changes and variations is within the scope of the present invention.

I claim:

1. A method of locking a strap latch of the type with a lever arm strap-grip comprising:

allowing a strap to be threaded though a locking latch frame, said locking latch frame having at least one hole;

providing a locking knob movably attached to a latch frame, said locking knob abutting a plate member and adapted to force the plate member against the strap, said plate member having at least one protrusion aligned with the hole in said locking latch frame, said strap running between the locking latch frame and the plate member;

providing a cam adapted to cooperate with the plate member such that as the plate member is tightened, the cam exerts pressure on the strap holding the strap;

adapting said locking knob so that it can depress said plate member against the strap, clamping said strap to said latch frame by pressing said protrusion partially into said hole pinching the strap without slippage.

2. The method of claim 1 wherein said locking knob is a screw-down knob.

3. The method of claim 2 wherein said locking knob travels up and down a threaded post.

4. The method of claim 1 wherein said protrusion is a grommet.

5. A inserted strap securing latch system of the type with a pivoting latch lever arm having an extended first end and a toothed second end engaging a strap comprising:

a latch frame containing a at least one hole;

a locking knob cooperating with said latch frame and adapted to move toward and away from said strap, said locking knob abutting a brake plate member;

said brake plate member attached to a cam through a lever, the cam adapted to apply pressure to the strap holding it in place as the locking knob is tightened;

said brake plate member having a at least one grommet aligned with said hole in the latch frame, said brake plate member engaging said strap when said locking knob is caused to move toward said strap, said brake plate member clamping said strap between said brake plate member and a portion of said latch frame by depressing said grommet partially into said hole pinching the strap.

6. The strap securing latch system of claim 5 wherein said locking knob is a screw-down knob.

7. The strap securing latch system of claim 6 wherein said locking knob travels up and down a threaded post, said threaded post attached to said latch frame.

8. The strap securing latch system of claim 6 further comprising a slitted hook that allows a pre-sewn strap to be inserted.

9. A strap locking latch system comprising:

a latch frame adapted to receive a strap wherein said strap lies flat against at least a portion of said latch frame, the latch frame containing at least one hole;

a braking plate positioned above said strap having at least one protrusion;

a locking cam cooperating with the braking plate and engaging said strap while said braking plate is being tightened;

a screw-down knob abutting said braking plate, wherein tightening said screw-down knob clamps said strap between said braking plate and the latch frame by pinching the strap between the protrusion in the braking plate and the hole in the latch frame.

10. The strap locking latch system of claim 9 wherein said protrusion is a grommet.

11. The strap locking latch system of claim 9 further comprising at least one slitted hook that allows a pre-sewn strap to be inserted.

* * * * *